US012057797B2

(12) United States Patent
Suda

(10) Patent No.: US 12,057,797 B2
(45) Date of Patent: Aug. 6, 2024

(54) ELECTRIC-POWERED WHEELBARROW

(71) Applicant: MAKITA CORPORATION, Anjo (JP)

(72) Inventor: Hidekazu Suda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 87 days.

(21) Appl. No.: 17/903,580

(22) Filed: Sep. 6, 2022

(65) Prior Publication Data

US 2023/0077565 A1 Mar. 16, 2023

(30) Foreign Application Priority Data

Sep. 13, 2021 (JP) ................................ 2021-148767

(51) Int. Cl.

| | |
|---|---|
| ***H02P 3/18*** | (2006.01) |
| ***B60L 7/00*** | (2006.01) |
| ***B60L 50/60*** | (2019.01) |
| ***H02P 3/04*** | (2006.01) |
| ***H02P 23/14*** | (2006.01) |

(52) U.S. Cl.

CPC .................. *H02P 3/18* (2013.01); *B60L 7/00* (2013.01); *B60L 50/60* (2019.02); *H02P 23/14* (2013.01); *B60L 2200/36* (2013.01)

(58) Field of Classification Search

CPC ........ B60L 50/60; B60L 7/00; B60L 2200/36; H02P 3/04; H02P 3/18; H02P 23/14

See application file for complete search history.

(56) References Cited

U.S. PATENT DOCUMENTS

| | | | | |
|---|---|---|---|---|
| 3,417,304 A * | 12/1968 | Letourneau | B60L 50/11 | 318/149 |
| 4,232,910 A * | 11/1980 | Snyder | B60T 8/1708 | 303/123 |
| 4,841,446 A * | 6/1989 | Leiber | B60T 8/885 | 701/76 |
| 7,870,917 B2 * | 1/2011 | Akagi | A61G 5/045 | 180/65.6 |
| 8,397,883 B2 * | 3/2013 | St. Clair | F16D 57/002 | 188/161 |
| 10,008,910 B2 * | 6/2018 | Jahshan | H02P 6/14 | |
| 2001/0002099 A1 * | 5/2001 | Itoh | B65G 13/075 | 318/727 |

(Continued)

FOREIGN PATENT DOCUMENTS

JP 6865512 B2 4/2021

*Primary Examiner* — Thai T Dinh

(74) *Attorney, Agent, or Firm* — Oliff PLC

(57) ABSTRACT

An electric-powered wheelbarrow in one aspect of the present disclosure includes a motor, a wheel, an electromagnetic brake, a control circuit, a signal-processing circuit, and a drive circuit. The electromagnetic brake includes an electromagnetic coil. The electromagnetic brake (i) applies a braking force to the wheel in response to the electromagnetic coil being de-energized and (ii) releases the braking force from the wheel in response to the electromagnetic coil being energized. The control circuit outputs a first control signal and a second control signal. The signal-processing circuit receives the first and second control signals to thereby output a deactivating signal. The drive circuit receives the deactivating signal and delivers an excitation current to the electromagnetic coil.

19 Claims, 7 Drawing Sheets

(56) References Cited

U.S. PATENT DOCUMENTS

| | | | | |
|---|---|---|---|---|
| 2006/0096793 | A1* | 5/2006 | Akagi | H02K 7/14<br>180/65.1 |
| 2018/0372216 | A1* | 12/2018 | Yamanaka | B60K 20/02 |

* cited by examiner 43
44
81a
81
81b
82b
82a
85
82
80
Reg.
64
SECOND CONTROLLER
70
50
D1
D3
D2
D4
53
52
MOTOR
DRIVER
25v
25u
25
25w
60
41a
42a
54
Reg.
41
42
51
CONTROL
CIRCUIT
CPU
MEMORY
51a
51b
Sa
Sb
Scom
62
SIGNAL
PROCESSING
CIRCUIT
R1
61
66
65
FIRST CONTROLLER
D13
Scom
69
30
31a
63
67
R3
C3
68
D10
USER'S
MANIPULATION
MANIPULATION
SWITCH
14
45

ELECTRIC-POWERED WHEELBARROW

CROSS-REFERENCE TO RELATED APPLICATIONS

The present application claims the benefit of Japanese Patent Application No. 2021-148767 filed on Sep. 13, 2021 with the Japan Patent Office, the entire disclosure of which is incorporated herein by reference.

BACKGROUND

The present disclosure relates to an electric-powered wheelbarrow.

Japanese Patent Publication No. 6865512 discloses a wheel hand truck including an electromagnetic brake. The electromagnetic brake (i) brakes wheels during the electromagnetic brake receiving an electric power and (ii) deactivates braking during the electromagnetic brake not receiving the electric power.

SUMMARY

There may be a case where the wheel hand truck utilizes an electromagnetic power-off brake in place of the aforementioned electromagnetic brake. The electromagnetic power-off brake (i) brakes a wheel during an electric power being not supplied thereto and (ii) deactivates braking during the electric power being supplied thereto.

When there is an improper control on a supply of the electric power to the electromagnetic power-off brake, the electromagnetic power-off brake may be unintentionally deactivated.

It is desirable that one aspect of the present disclosure can properly control an electromagnetic power-off brake of an electric-powered wheelbarrow.

One aspect of the present disclosure provides an electric-powered wheelbarrow (or an electric-powered dolly). The electric-powered wheelbarrow includes a motor. The electric-powered wheelbarrow includes a motor driver. The motor driver delivers an electric power to the motor to thereby rotate the motor. The electric-powered wheelbarrow includes a wheel. The wheel is driven by the motor. The electric-powered wheelbarrow may include a grip. The grip may be gripped by a user of the electric-powered wheelbarrow who stands on a surface of a travel path for the electric-powered wheelbarrow.

The electric-powered wheelbarrow includes an electromagnetic brake. The electromagnetic brake includes an electromagnetic coil. The electromagnetic coil receives an excitation current to thereby be energized. The electromagnetic brake is in the form of an electromagnetic power-off brake. That is, the electromagnetic brake is activated to apply a braking force to the wheel in response to the electromagnetic coil being de-energized (or degaussed). The electromagnetic brake is deactivated to release the braking force from the wheel in response to the electromagnetic coil being energized (or excited).

The electric-powered wheelbarrow includes a control circuit. The control circuit outputs a first control signal and a second control signal. The control circuit may output the first and second control signals in response to a deactivating requirement being satisfied or having been satisfied. The deactivating requirement is required to deactivate the electromagnetic brake.

The electric-powered wheelbarrow includes a signal-processing circuit. The signal-processing circuit (i) receives the first and second control signals and (ii) to thereby output a deactivating signal.

The electric-powered wheelbarrow includes a drive circuit. The drive circuit receives the deactivating signal to thereby deliver (or supply) the excitation current (or an exciting current or an energizing current) to the electromagnetic coil.

In the electric-powered wheelbarrow described above, the electromagnetic brake is not deactivated even when a certain malfunction (for example, a faulty state of the control circuit) causes output of the first or second control signal despite a situation to activate the electromagnetic brake. In other words, the electromagnetic brake is not deactivated when only one of the first or second control signal is output. Accordingly, such an electric-powered wheelbarrow enables proper control of the electromagnetic brake. More specifically, it is possible to inhibit or reduce unintentional deactivation of the electromagnetic brake.

Another aspect of the present disclosure provides a method of controlling an electromagnetic brake of an electric-powered wheelbarrow. The method includes receiving a first control signal and a second control signal. Each of the first and second control signals permits deactivation of the electromagnetic brake. The method includes deactivating the electromagnetic brake in response to receipt of the first and second control signals.

This method can exhibit the same effect as the effect of the above-described electric-powered wheelbarrow.

BRIEF DESCRIPTION OF THE DRAWINGS

An embodiment of the present disclosure will be described hereinafter by way of example with reference to the accompanying drawings, in which.

DETAILED DESCRIPTION OF EXEMPLARY EMBODIMENTS

Overview of Embodiments

Figure 1:
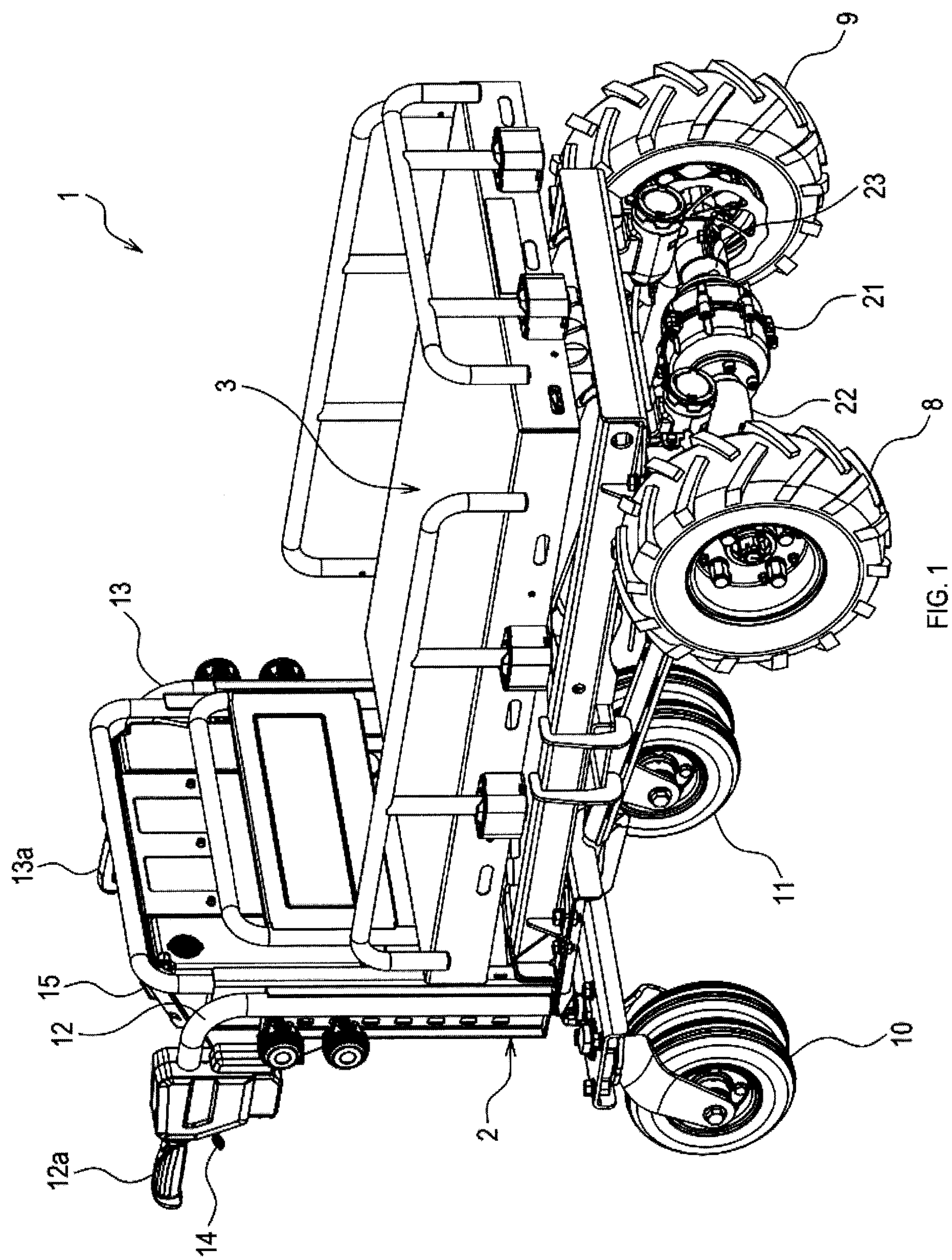
FIG. 1 is a perspective view of an electric-powered wheelbarrow according to an embodiment.

There is provided an electric-powered wheelbarrow according to an embodiment. The electric-powered wheelbarrow may include a motor. The electric-powered wheelbarrow may include a motor driver. The motor driver may deliver an electric power to the motor to thereby rotate the motor. Additionally/alternatively, the electric-powered wheelbarrow may include a wheel configured to be driven by the motor. Additionally/alternatively, the electric-powered wheelbarrow may include a grip. The grip may be gripped by a user of the electric-powered wheelbarrow. The grip may be gripped by the user who stands on a surface of a travel path for the electric-powered wheelbarrow.

Additionally/alternatively, the electric-powered wheelbarrow may include an electromagnetic brake. The electromagnetic brake may include an electromagnetic coil. The electromagnetic coil may receive an excitation current to thereby be energized. The electromagnetic brake is configured to apply a braking force to the wheel (or to brake the wheel, or to brake the electric-powered wheelbarrow). The electromagnetic brake may be activated in response to the electromagnetic coil being de-energized (or degaussed). That is, the electromagnetic brake may apply the braking force to the wheel in response to the electromagnetic coil being de-energized. The electromagnetic coil may be de-energized by interruption of a path of the excitation current thereto. The electromagnetic brake may be deactivated in response to the electromagnetic coil being energized. That is, in response to the electromagnetic coil being energized, the electromagnetic brake may release the braking force from the wheel (or deactivate braking of the wheel, or deactivate braking of the electric-powered wheelbarrow). The electromagnetic coil may be energized with supply (or delivery) of the excitation current thereto.

The electromagnetic brake may directly or indirectly apply the braking force to the wheel. For example, the electromagnetic brake may directly apply the braking force to the motor, to thereby indirectly (that is, resultantly) brake the wheel. Furthermore, the wheel may be indirectly applied with the braking force by, for example, the electromagnetic brake directly applying the braking force to a transmission path to transmit a rotational force of the motor to the wheel.

Additionally/alternatively, the electric-powered wheelbarrow may include a control circuit (or a brake control circuit). The control circuit may output a first control signal and a second control signal. The control circuit may output the first and second control signals in response to a deactivating requirement being satisfied or having been satisfied. The deactivating requirement may correspond to (or be related to) a requirement to deactivate the electromagnetic brake (that is, deactivate braking by the electromagnetic brake). That is, the deactivating requirement may be required to deactivate the electromagnetic brake.

Additionally/alternatively, the electric-powered wheelbarrow may include a signal-processing circuit. The signal-processing circuit may output a deactivating signal in response to receiving both the first and second control signals.

Additionally/alternatively, the electric-powered wheelbarrow may include a drive circuit. The drive circuit may deliver (or supply) the excitation current to the electromagnetic coil in response to receiving the deactivating signal.

In a case where an electric-powered wheelbarrow according to an embodiment includes the motor, the motor driver, the wheel, the grip, the electromagnetic brake, the control circuit, the signal-processing circuit, and the drive circuit, which are mentioned above, such an electric-powered wheelbarrow can properly control the electromagnetic brake. More specifically, it is possible to inhibit or reduce unintentional deactivation of the electromagnetic brake.

Additionally/alternatively, the first and second control signals may have forms different from each other. Specifically, the first control signal may have a fixed voltage greater than zero. A state where the first control signal has the fixed voltage may correspond to the first control signal being in a first proper state. Alternatively, a state where the first control signal has the fixed voltage of a specific value or more may correspond to the first control signal being in the first proper state. That the first control signal has the fixed voltage may mean that (i) the first control signal has a direct current (DC) voltage and (ii) the DC voltage has the fixed voltage. In this case, the DC voltage may have only the fixed voltage. Alternatively, the DC voltage may include multiple voltage components and one of the multiple voltage components may be the fixed voltage. The second control signal may have two or more pulse voltages. The two or more pulse voltages may be periodically or non-periodically output. A state where the second control signal has the two or more pulse voltages may correspond to the second control signal being in a second proper state.

The signal-processing circuit may output the deactivating signal in response to (i) the first control signal received being in a first proper state and (ii) the second control signal received being in a second proper state. In a case where an electric-powered wheelbarrow according to an embodiment includes the signal-processing circuit with the aforementioned features, the electromagnetic brake is deactivated when both the first and second control signals are properly output. Thus, it is possible to improve reliability of the electromagnetic brake.

Additionally/alternatively, the signal-processing circuit may include a first circuit. The first circuit may enable the second control signal in response to the first control signal received being in the first proper state. Additionally/alternatively, the signal-processing circuit may include a second circuit. The second circuit may detect the second control signal enabled. The second circuit may detect the second control signal (i) having been enabled by the first circuit and (ii) being in the second proper state. That is, the second circuit may not detect the second control signal (i) having been enabled by the first circuit and (ii) not being in the second proper state. Additionally/alternatively, the signal-processing circuit may include a third circuit. The third circuit may output the deactivating signal during the second circuit detecting the second control signal enabled. In a case where an electric-powered wheelbarrow according to an embodiment includes the signal-processing circuit with the aforementioned features, such an electric-powered wheelbarrow can output a deactivating signal with high reliability. Accordingly, it is possible to improve reliability of the electromagnetic brake.

Additionally/alternatively, the drive circuit may (i) receive the excitation current from the first battery and (ii) deliver the excitation current to the electromagnetic coil.

Additionally/alternatively, the motor driver may receive, from a first battery or a second battery, the electric power to be delivered to the motor. Additionally/alternatively, the drive circuit may receive, from a first battery or a second battery, the excitation current to be delivered to the electromagnetic coil. In a case where an electric-powered wheelbarrow according to an embodiment includes the motor driver and the drive circuit with the aforementioned feature, such an electric-powered wheelbarrow can provide the user with various ways to use the first and second batteries. For example, the user may mount both the first and second batteries on the electric-powered wheelbarrow. In this case, the user can make the electric-powered wheelbarrow keep travelling for a long time. Alternatively, the user may mount only one of the first or second battery on the electric-powered wheelbarrow, to thereby make the electric-powered wheelbarrow travel.

Additionally/alternatively, the first battery may include a first positive electrode, and the second battery may include a second positive electrode. Additionally/alternatively, the electric-powered wheelbarrow may include a selector circuit. The selector circuit may be connected to the first and second positive electrodes. The selector circuit may (i) receive a first current from the first battery and a second current from the second battery and (ii) output the excitation current including the first or second current. In other words, the selector circuit may output the first or second current as the excitation current. Additionally/alternatively, the drive circuit may receive the excitation current from the selector circuit and deliver, to the electromagnetic coil, the excitation current received.

Additionally/alternatively, the selector circuit may include a first rectifier circuit. The first rectifier circuit may include a first input terminal to receive the first current from the first battery. The first rectifier circuit may include a first output terminal to output the first current received from the first input terminal. The first rectifier circuit may inhibit the second current from flowing from the first output terminal to the first input terminal. Additionally/alternatively, the selector circuit may include a second rectifier circuit. The second rectifier circuit may include a second input terminal to receive the second current from the second battery. The second rectifier circuit may include a second output terminal connected to the first output terminal. The second output terminal may output the second current received from the second input terminal. The second rectifier circuit may inhibit the first current from flowing from the second output terminal to the second input terminal. In a case where an electric-powered wheelbarrow according to an embodiment includes the selector circuit and the drive circuit with the aforementioned features, such an electric-powered wheelbarrow can easily deliver, to the electromagnetic coil, the electric power of the first battery or the electric power of the second battery.

Additionally/alternatively, the electric-powered wheelbarrow may include a voltage adjustment circuit (or a voltage control circuit). The voltage adjustment circuit may adjust (or control) an excitation voltage to be applied to the electromagnetic coil. In a case where an electric-powered wheelbarrow according to an embodiment includes the voltage adjustment circuit with the aforementioned features, such an electric-powered wheelbarrow can control the electromagnetic brake efficiently.

Additionally/alternatively, the control circuit may output a voltage command signal to the voltage adjustment circuit. The voltage command signal designates (or commands) a desired magnitude (or a target value or a desired value) of the excitation voltage. Additionally/alternatively, the voltage adjustment circuit may receive the voltage command signal. The voltage adjustment circuit may adjust the excitation voltage so as to maintain an actual magnitude of the excitation voltage at the desired magnitude designated by the voltage command signal received. In a case where an electric-powered wheelbarrow according to an embodiment includes the control circuit and the voltage adjustment circuit with the aforementioned features, such an electric-powered wheelbarrow can control the electromagnetic brake more efficiently.

Additionally/alternatively, the control circuit may keep outputting, for a specific length of time, the voltage command signal designating a first value as the desired magnitude in response to a deactivating requirement being satisfied. The deactivating requirement is required to deactivate the electromagnetic brake.

Additionally/alternatively, the control circuit may, in response to having output, for the specific length of time, the voltage command signal to designate the first value, output the voltage command signal designating a second value as the desired magnitude. The second value is smaller than the first value. In a case where an electric-powered wheelbarrow according to an embodiment includes the control circuit with the aforementioned features, such an electric-powered wheelbarrow can maintain deactivation of the electromagnetic brake while reducing a power consumption of the electromagnetic brake.

Additionally/alternatively, the electric-powered wheelbarrow may further include a voltage detection circuit. The voltage detection circuit may (i) receive the excitation voltage applied to the electromagnetic coil and (ii) generate an actual voltage signal. The actual voltage signal indicates a mean value of the excitation voltage received. Additionally/alternatively, the voltage adjustment circuit may adjust the excitation voltage so as to maintain the mean value indicated by the actual voltage signal at the desired magnitude (for example, the first or second value).

Additionally/alternatively, the voltage adjustment circuit may, during the drive circuit receiving the deactivating signal, operate the drive circuit so as to deliver the excitation current to the electromagnetic coil in response to the mean value indicated by the actual voltage signal being smaller than the desired magnitude indicated by the voltage command signal. The voltage adjustment circuit may, during the drive circuit receiving the deactivating signal, operate the drive circuit so as to stop the excitation current in response to the mean value indicated by the actual voltage signal being equal to or greater than the desired magnitude indicated by the voltage command signal.

There is provided a method of controlling an electromagnetic brake according to an embodiment. The method may be employed in an electric-powered wheelbarrow. The method may include receiving a first control signal and a second control signal. Each of the first and second control signals permits deactivation of the electromagnetic brake. Additionally/alternatively, the method may include, in response to receipt of the first and second control signals, deactivating the electromagnetic brake.

In a case where a method of controlling an electromagnetic brake according to an embodiment includes all the processes mentioned above, such a method enables proper control of the electromagnetic brake.

In one embodiment, the features above may be combined in any manner. In one embodiment, at least one of the features above may be omitted (or eliminated).

2. Specific Exemplary Embodiment

(1) Overview of Electric-Powered Wheelbarrow

Figure 2:
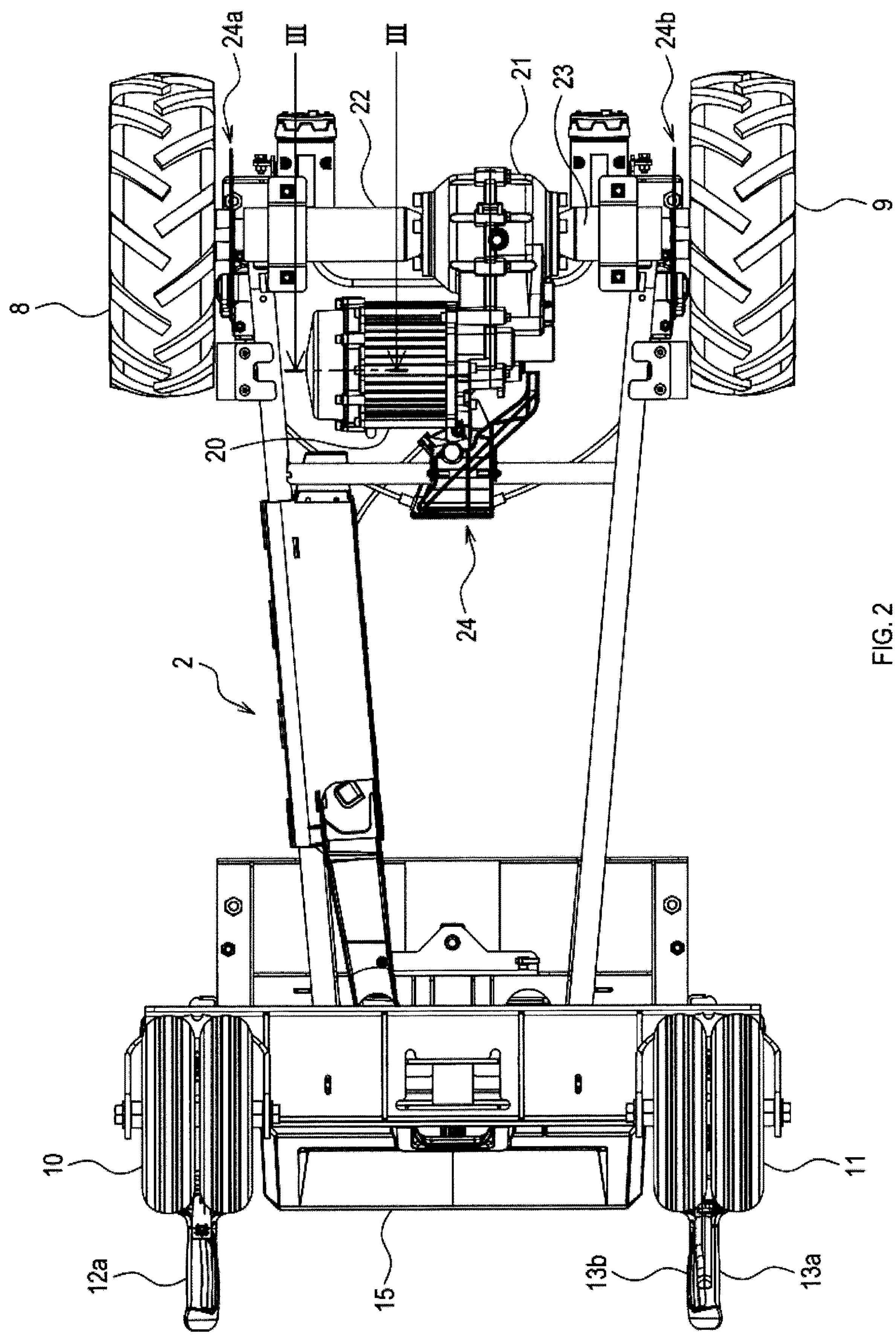
FIG. 2 is a bottom view of the electric-powered wheelbarrow without a platform.

As shown in FIGS. 1 and 2, there is provided an electric-powered wheelbarrow 1 in the present embodiment. The electric-powered wheelbarrow 1 includes a main body 2 and two or more wheels. The two or more wheels include one or more front wheels and one or more rear wheels. In the present embodiment, the one or more front wheels include, for example, two front wheels 8, 9, and the one or more rear wheels are, for example, two rear wheels 10, 11. In other words, the electric-powered wheelbarrow 1 in the present embodiment is in the form of a four-wheeled vehicle.

In the present embodiment, for example, each of the front wheels 8, 9 corresponds to a drive wheel, and each of the rear wheels 10, 11 corresponds to a driven wheel. The front wheels 8, 9 are driven (that is, rotated) by a motor 25, which will be described below (see, FIGS. 3 and 4).

The main body 2 includes a platform 3 fixed thereto. The platform 3 is detachable from the main body 2. The platform 3 can be loaded with various material. A user of the electric-powered wheelbarrow 1 operates the electric-powered wheelbarrow 1 with the material loaded on the platform 3 to carry the material. The user can selectively fix, to the main body 2, any one of two or more types of the platform 3.

Figure 3:
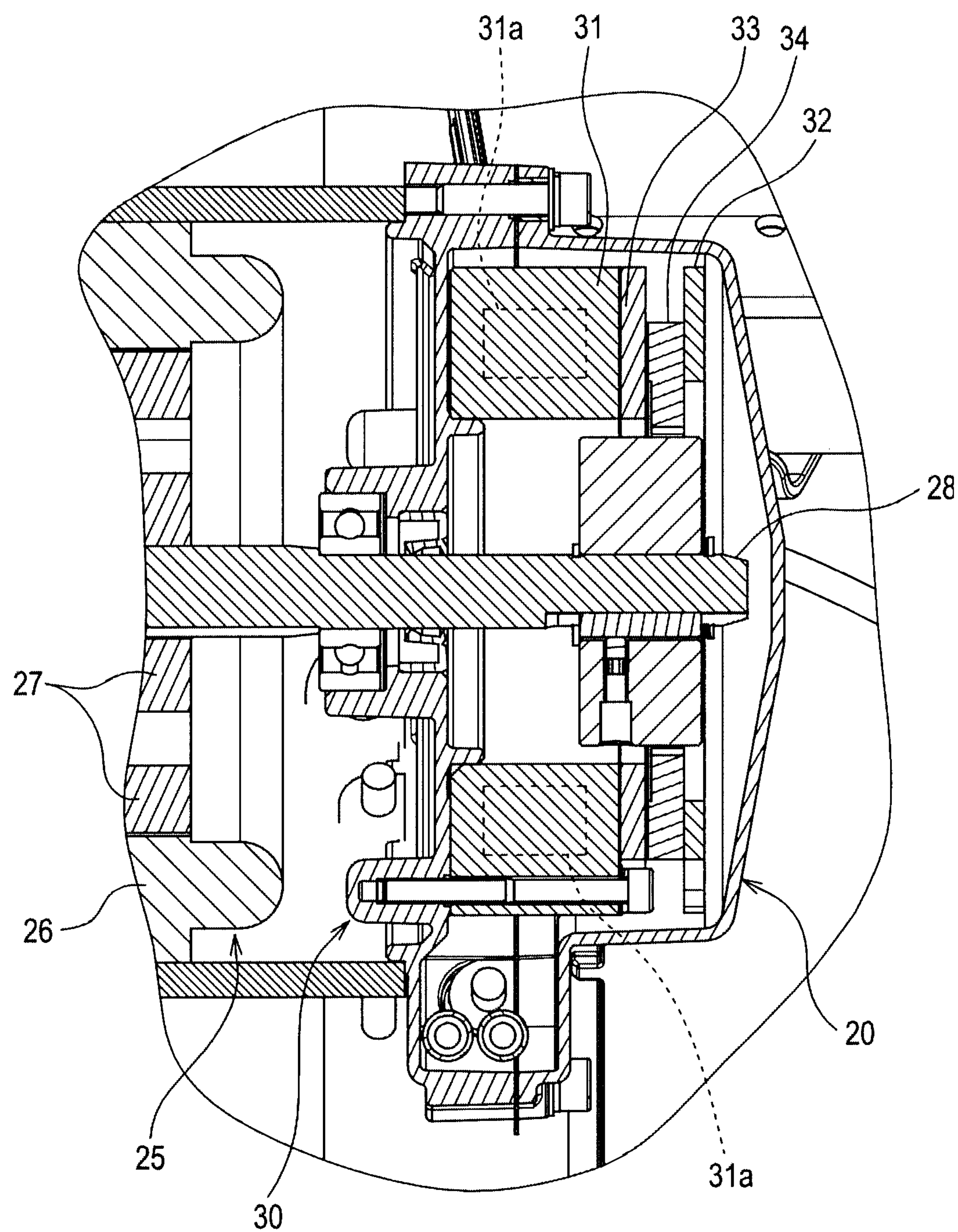
FIG. 3 is a cross-sectional view along a line in FIG. 2.
Figure 4:
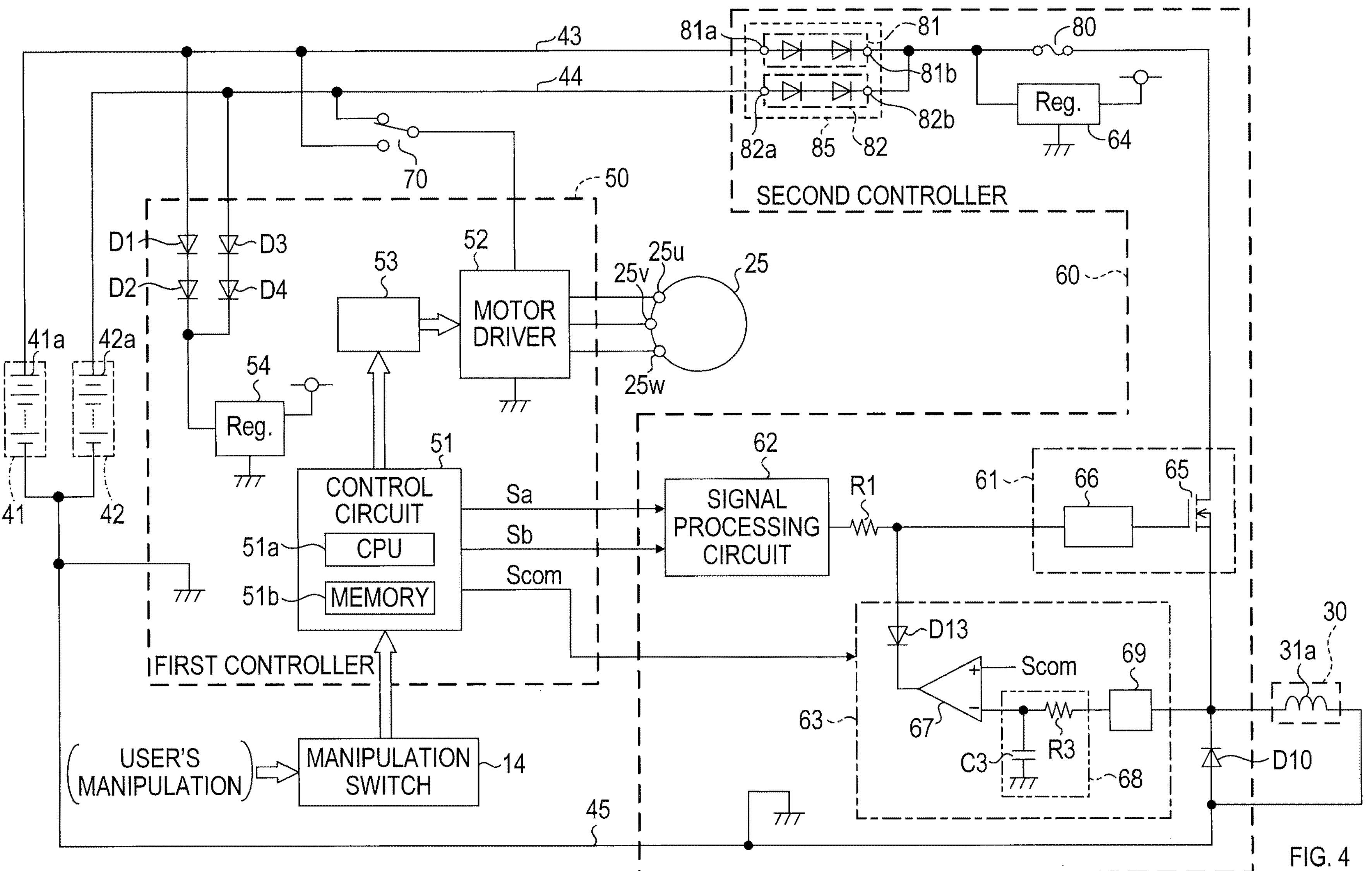
FIG. 4 is a block diagram showing a configuration of an electric system of the electric-powered wheelbarrow.

As shown in FIGS. 2 and 3, the electric-powered wheelbarrow 1 further includes a motor device 20. As shown in FIG. 3, the motor device 20 houses the motor 25. As shown in FIGS. 3 and 4, the electric-powered wheelbarrow 1 further includes an electromagnetic brake 30. In the present embodiment, the electromagnetic brake 30 is housed in, for example, the motor device 20.

As shown in FIG. 3, the motor 25 includes a motor stator 26, a motor rotor 27, and a motor shaft 28. The motor rotor 27 includes, for example, a permanent magnet. The motor shaft 28 is fixed to the motor rotor 27. In accordance with rotation of the motor rotor 27, the motor shaft 28 is rotated. In the present embodiment, the term "rotation" of the motor 25 specifically means that the motor shaft 28 rotates.

The motor 25 in the present embodiment is in the form of, for example, a three-phase brushless DC motor (or a brushless motor, or a three-phase brushless motor, or a brushless DC motor). As shown in FIG. 4, the motor 25 includes a first terminal 25*u*, a second terminal 25*v*, and a third terminal 25*w*. The motor stator 26 includes, for example, three windings (not shown). Each of the three windings is connected to one or two of the first through third terminals 25*u* through 25*w*. The three windings may be connected to one another in any manner. The three windings may be connected to one another, for example, in a delta connection, or in a star (or wye) connection. An electric power is delivered, via the first through third terminals 25*u* through 25*w*, to the three windings, and thereby the motor rotor 27 (and thus the motor shaft 28) rotates.

As shown in FIGS. 1 and 2, the electric-powered wheelbarrow 1 further includes a transmission mechanism 21. The transmission mechanism 21 is mechanically coupled to the motor 25 and the drive wheels (that is, the front wheels 8, 9). The transmission mechanism 21 transmits a rotational force of the motor 25 (that is, a rotational force of the motor shaft 28) to the drive wheels. More specifically, the transmission mechanism 21 transmits the rotational force of the motor 25 to the front wheel 8 via a right drive shaft 22, and also to the front wheel 9 via a left drive shaft 23. The transmission mechanism 21 may include, for example, a differential gear.

As shown in FIG. 2, the electric-powered wheelbarrow 1 further includes a mechanical brake 24. The mechanical brake 24 brakes the front wheels 8, 9 (that is, controls rotation of the front wheels 8, 9) with a friction force. In the present embodiment, the mechanical brake 24 includes, for example, a right disc brake 24*a* and a left disc brake 24*b*. The right disc brake 24*a* brakes the front wheel 8. That is, the right disc brake 24*a* includes two brake pads and a brake disc that rotates integrally with the front wheel 8. The left disc brake 24*b* includes two brake pads and a brake disc that rotates integrally with the front wheel 9. In response to being manually operated by the user, the mechanical brake 24 is activated. When the mechanical brake 24 is activated, each brake disc is pressed (or squeezed) by its corresponding two brake pads, and thereby the front wheels 8, 9 are braked.

As shown in FIG. 1, the main body 2 includes a right handle bar 12 and a left handle bar 13. Each of the right handle bar 12 and the left handle bar 13 has a bar-shape with, for example, a curve like an L-shape. As shown in FIGS. 1 and 2, the right handle bar 12 is provided with a right grip 12*a* at its first end. The left handle bar 13 is provided with a left grip 13*a* at its first end. For example, the right grip 12*a* is gripped by the right hand of the user, and the left grip 13*a* is gripped by the left hand of the user.

As shown in FIG. 2, the main body 2 includes a brake lever 13*b*. The brake lever 13*b* is provided, for example, on the left handle bar 13 near the left grip 13*a*. For example, the user can manually move (or manually operate) (for example, pull) the brake lever 13*b* with the left hand while gripping the left grip 13*a* with the left hand. The brake lever 13*b* is manually moved to activate the mechanical brake 24, thereby applying a braking force of the mechanical brake 24 to the front wheels 8, 9. The braking force of the mechanical brake 24 has a magnitude that varies depending on a position (or a pulled distance) of the brake lever 13*b*.

The electromagnetic brake 30 in the present embodiment applies the braking force to the drive wheels (or brakes the drive wheels or brakes the electric-powered wheelbarrow 1). More specifically, the electromagnetic brake 30 in the present embodiment directly applies the braking force to the motor 25, to thereby indirectly apply the braking force to the drive wheel. The electromagnetic brake 30 in the present embodiment is in the form of an electromagnetic power-off brake. As shown in FIG. 3, the electromagnetic brake 30 includes, for example, a brake stator 31, a brake plate 32, an armature 33, and a brake rotor 34. The brake stator 31 includes an electromagnetic coil 31*a* therein. The brake stator 31 and the brake plate 32 are fixed inside the motor device 20.

The brake rotor 34 is fixed to the motor shaft 28. As the motor shaft 28 rotates, the brake rotor 34 also rotates. The armature 33 is elastically supported to be movable along a direction perpendicular to a rotational surface of the brake rotor 34 (that is, a direction parallel to an axial direction of the motor shaft 28). The armature 33 is subjected to an elastic force in a direction toward the brake plate 32.

When the electric power (that is, an excitation current) is not delivered (or supplied) to the electromagnetic coil 31*a*, the electromagnetic coil 31*a* is de-energized (or degaussed). During the electromagnetic coil 31*a* being de-energized, the electromagnetic brake 30 is turned ON (that is, activated). That is, the electromagnetic brake 30 brakes the motor 25 (specifically, the rotation of the motor shaft 28), to thereby brake the drive wheels. Specifically, when the excitation current is not delivered to the electromagnetic coil 31*a*, the armature 33 moves toward the brake plate 32 due to the elastic force described above. This causes the brake rotor 34 to be squeezed by the armature 33 and the brake plate 32, thereby braking rotation of the brake rotor 34. When the brake rotor 34 is braked, the motor 25 and thus the drive wheels are braked.

On the other hand, when receiving the excitation current, the electromagnetic coil 31*a* is energized (or activated) and acts as an electromagnet. This turns OFF (that is, deactivates or releases) the electromagnetic brake 30, that is, deactivates braking of the motor 25 (and thus the drive wheels) by the electromagnetic brake 30. Specifically, when the excitation current is delivered to the electromagnetic coil 31*a*, the armature 33 moves away from the brake plate 32 and the brake rotor 34 due to a magnetic force of the electromagnetic coil 31*a*. Consequently, the brake rotor 34 does not contact the armature 33 and the brake plate 32, resulting in the electromagnetic brake 30 not applying the braking force to the motor shaft 28. Accordingly, the braking force on the drive wheels (specifically, an indirect braking force) is deactivated.

The electric-powered wheelbarrow 1 in the present embodiment may be braked by the above-described mechanical brake 24 and/or the electromagnetic brake 30.

The electric-powered wheelbarrow 1 in the present embodiment may be further braked by dynamic braking. The dynamic braking in the present embodiment includes, for example, three-phase dynamic braking and/or two-phase dynamic braking. The three-phase dynamic braking corresponds to short-circuiting the first through third terminals 25*u* through 25*w* of the motor 25 to one another. The two-phase dynamic braking corresponds to short-circuiting any two terminals of the first through third terminals 25*u* through 25*w* to one another.

As shown in FIG. 1, the main body 2 includes a manipulation switch 14. The manipulation switch 14 is provided, for example, on the right handle bar 12 near the right grip 12*a*. The manipulation switch 14 in the present embodiment is in the form of, for example, a lever. For example, the user can manually operate (for example, pull) the manipulation switch 14 with the right hand while gripping the right grip 12*a* with the right hand.

As shown in FIGS. 1 and 2, the main body 2 includes a battery box 15. The battery box 15 is arranged, for example, between the right handle bar 12 and the left handle bar 13. Two or more battery packs are detachably attached to the battery box 15. For example, a first battery pack 41 and a second battery pack 42 (see, FIG. 4) are individually attached to the battery box 15 in the present embodiment.

The user can use the electric-powered wheelbarrow 1 while standing on a ground. Specifically, the user can move or stop the electric-powered wheelbarrow 1 on the ground while gripping the right grip 12*a* and/or the left grip 13*a*. The user can manually operate the manipulation switch 14 while gripping the right grip 12*a* and/or the left grip 13*a*. Upon the manipulation switch 14 being manually operated, the motor 25 is driven, to thereby drive the front wheels 8, 9. Upon the front wheels 8, 9 being driven, the electric-powered wheelbarrow 1 travels. While gripping the right grip 12*a* and/or the left grip 13*a*, the user can walk or run as the electric-powered wheelbarrow 1 travels. Accordingly, the user can easily use the electric-powered wheelbarrow 1 while having a less physical burden. The user may push or pull the electric-powered wheelbarrow 1 by himself/herself, thereby allowing the electric-powered wheelbarrow 1 to travel.

(2) Electrical Configuration of Electric-Powered Wheelbarrow

As shown in FIG. 4, the electric-powered wheelbarrow 1 includes a first controller 50. The first controller 50 controls the motor 25 and the electromagnetic brake 30. The electric-powered wheelbarrow 1 further includes a second controller 60. The second controller 60 drives the electromagnetic brake 30. The second controller 60 in the present embodiment drives the electromagnetic brake 30 based on various signals from the first controller 50. The various signals include a first control signal Sa, a second control signal Sb, and a command signal Scorn, which will be described later.

The first controller 50 includes a control circuit 51. The first and second control signals Sa, Sb and the command signal Scorn are output from the control circuit 51. The control circuit 51 in the present embodiment is in the form of, for example, a microcomputer including a central processing unit (CPU) 51*a* and a memory 51*b*. The memory 51*b* may include, for example, a semiconductor memory such as a Read-Only Memory (ROM), a Random-Access Memory (RAM), a Nonvolatile RAM (NVRAM), or a flash memory.

The control circuit 51 achieves various functions by executing a program stored in a non-transitory tangible storage medium. In the present embodiment, the memory 51*b* corresponds to the non-transitory tangible storage medium storing the program. The memory 51*b* stores a program for an electromagnetic braking process (see, FIG. 7), which will be described below.

Some or all of the various functions implemented by the control circuit 51 may be achieved by executing a program (that is, by software processing), or may be achieved by one or some hardware. For example, the control circuit 51 may include a logic circuit including two or more electronic components, in place of or in addition to the microcomputer. The control circuit 51 may include an integrated circuit (IC) for a particular use, such as an Application Specific Integrated Circuit (ASIC) and/or an Application Specific Standard Product (ASSP), or include a programmable logic device that can be programmed to create a logic circuit, for example, a Field Programmable Gate Array (FPGA).

The control circuit 51 directly or indirectly receives an operation signal from the manipulation switch 14. The operation signal indicates whether the manipulation switch 14 is turned ON. When the user manually operates the manipulation switch 14, the manipulation switch 14 is turned ON. The control circuit 51 can identify whether the manipulation switch 14 is turned ON based on the operation signal. The manipulation switch 14 may be turned ON during the manipulation switch 14 being manually operated, and may be turned OFF upon manual operation of the manual switch 14 being deactivated. The control circuit 51 drives the motor 25 during the manipulation switch 14 being turned ON.

The control circuit 51 outputs the first and second control signals Sa, Sb and the command signal Scom in response to a deactivating requirement being satisfied or having been satisfied. The deactivating requirement corresponds to a requirement to deactivate the electromagnetic brake 30 (that is, deactivate the braking by (or the braking force of) the electromagnetic brake 30). That is, the deactivating requirement is required to deactivate the electromagnetic brake 30. When the control circuit 51 outputs the first and second control signals Sa, Sb, the electromagnetic brake 30 is turned OFF, and thereby the electromagnetic brake 30 is deactivated. When a braking requirement is satisfied after the deactivating requirement is satisfied, the control circuit 51 stops the first and second control signals Sa, Sb and the command signal Scom. As a result, the electromagnetic brake 30 is turned ON and the motor 25 is braked. The braking requirement corresponds to a requirement to activate the electromagnetic brake 30. That is, the braking requirement is required to activate the electromagnetic brake 30.

The deactivating requirement may be determined in any manner. For example, the deactivating requirement may be satisfied with the manipulation switch 14 having been manually operated. During the manipulation switch 14 being manually operated, the deactivating requirement may continue to be satisfied. The braking requirement may be determined in any manner. For example, the braking requirement may be satisfied with the manual operation of the manipulation switch 14 having been deactivated.

FIG. 4 shows an example state where both the first and second battery packs 41, 42, which are described above, are attached to the battery box 15. The first battery pack 41 includes a first battery 41*a*. The second battery pack 42 includes a second battery 42*a*. Each of the first and second batteries 41*a*, 42*a* functions as a power source for the electric-powered wheelbarrow 1. The motor 25 rotates with an electric power from the first or second battery 41*a*, 42*a*. The first battery 41*a* and/or the second battery 42*a* may be, for example, a rechargeable battery.

The first battery 41*a* has a first battery voltage Vb1. The second battery 42*a* has a second battery voltage Vb2. A rated value (hereinafter, referred to as "first rated value") of the first battery voltage Vb1 and a rated value (hereinafter, referred to as "second rated value") of the second battery voltage Vb2 may be any values. In the present embodiment, the first and second rated values are equal (or approximately equal) to each other. In the present embodiment, the first and second rated values are, for example, 36V.

The first and second batteries 41*a*, 42*a* may be configured in any manner. In the present embodiment, the first battery 41*a* includes two batteries connected to each other in series. A rated voltage of each of the two batteries may be any value. In the present embodiment, the rated voltage of each of the two batteries is one-half of the first rated value (for example, 18V). The second battery 42*a* in the present embodiment is configured in the same manner as the first battery 41*a*.

Each of the first and second battery packs 41, 42 is attachable to various electric apparatuses different from the electric-powered wheelbarrow 1. That is, each of the first and second battery packs 41, 42 can function as a power source for the various electric apparatuses. Examples of the various electric apparatuses include various job-site electric apparatuses used at job-sites, such as home carpentry, manufacturing, gardening, construction. Examples of the various job-site electric apparatuses include an electric drill, an electric screwdriver, an electric grinder, an electric circular saw, an electric bush/grass cutter, an electric cleaner, an electric blower, and an electric dust collector.

The electric-powered wheelbarrow 1 includes a first power-supply line 43, a second power-supply line 44, and a ground line 45. When the first battery pack 41 is attached to the battery box 15, a first end of the first power-supply line 43 is electrically connected to a positive electrode of the first battery 41*a*. Furthermore, a negative electrode of the first battery 41*a* is electrically connected to the ground line 45. When the second battery pack 42 is attached to the battery box 15, a first end of the second power-supply line 44 is electrically connected to a positive electrode of the second battery 42*a*. Furthermore, a negative electrode of the second battery 42*a* is electrically connected to the ground line 45. Each of the first and second power-supply lines 43, 44 includes a second end connected to the second controller 60.

The electric-powered wheelbarrow 1 includes a battery selector switch 70. In the present embodiment, the battery selector switch 70 is disposed, for example, on the battery box 15. The battery selector switch 70 includes a first terminal connected to the first power-supply line 43. The battery selector switch 70 includes a second terminal connected to the second power-supply line 44. The battery selector switch 70 includes a common terminal connected to the first controller 50.

In response to being manually operated by the user, the battery selector switch 70 sets one of the first or second battery pack 41, 42 as a power source for the motor 25. That is, the electric power of either one of the first or second battery 41*a*, 42*a* selected is delivered to the first controller 50. Hereinafter, the electric power to be input to the first controller 50 via the battery selector switch 70 is referred to as "motor drive electric power".

The first controller 50 includes a first gate circuit 53 and a motor driver 52. The control circuit 51 outputs two or more motor control signals to the first gate circuit 53. The two or more motor control signals are used for controlling rotation of the motor 25. The two or more motor control signals in the present embodiment include, for example, a pulse-width modulation signal (PWM signal). The first gate circuit 53 generates two or more drive signals corresponding to (or related to, or associated with) the respective two or more motor control signals. The first gate circuit 53 outputs, to the motor driver 52, the two or more drive signals generated.

The motor driver 52 receives the motor drive electric power. The motor driver 52 is connected to the first through third terminals 25*u* through 25*w* of the motor 25. The motor driver 52 includes, for example, a three-phase full-bridge circuit (not shown). Based on the two or more drive signals generated, the motor driver 52 converts the motor drive electric power into a three-phase drive power. The motor driver 52 delivers the three-phase drive power to the motor 25. The motor 25 rotates with the three-phase drive power.

The first controller 50 includes a first regulator 54. The first regulator 54 receives the first battery voltage Vb1 through diodes D1, D2. Furthermore, the first regulator 54 receives the second battery voltage Vb2 through diodes D3, D4.

The first regulator 54 generates a first control voltage Vc1 based on the first or second battery voltage Vb1, Vb2. The first control voltage Vc1 is delivered to the control circuit 51 and nearby circuit(s). The control circuit 51 is activated with the first control voltage Vc1.

The second controller 60 receives the first battery voltage Vb1 through the first power-supply line 43. Furthermore, the second controller 60 receives the second battery voltage Vb2 through the second power-supply line 44. The second controller 60 is connected to the electromagnetic brake 30. More specifically, the second controller 60 is connected to the electromagnetic coil 31*a*.

The second controller 60 includes a selector circuit 85. The selector circuit 85 includes a first rectifier circuit 81 and a second rectifier circuit 82. The first rectifier circuit 81 includes a first input terminal 81*a* and a first output terminal 81*b*. The second rectifier circuit 82 includes a second input terminal 82*a* and a second output terminal 82*b*. The first input terminal 81*a* is connected to the second end of the first power-supply line 43. The second input terminal 82*a* is connected to the second end of the second power-supply line 44. The first output terminal 81*b* is connected to the second output terminal 82*b*.

The second controller 60 includes a drive circuit 61. The drive circuit 61 includes a switch 65 and a second gate circuit 66. The switch 65 in the present embodiment includes, for example, an N-channel metal oxide semiconductor field-effect transistor (MOSFET). The switch 65 includes a gate connected to the second gate circuit 66.

The switch 65 includes a drain connected to the first and second output terminals 81*b*, 82*b*. More specifically, the second controller 60 includes a fuse 80. The first and second output terminals 81*b*, 82*b* are connected to the drain of the switch 65 via the fuse 80.

Each of the first and second rectifier circuits 81, 82 includes one or more rectifiers (or rectifier elements). In the present embodiment, each of the first and second rectifier circuits 81, 82 includes, for example, two diodes connected to each other in series as illustrated in FIG. 4. The first rectifier circuit 81 allows a current to flow from the first input terminal 81*a* through the first output terminal 81*b*, and prevents or inhibits the current from flowing from the first output terminal 81*b* through the first input terminal 81*a*. The second rectifier circuit 82 allows the current to flow from the second input terminal 82*a* through the second output terminal 82*b*, and prevents or inhibits the current from flowing from the second output terminal 82*b* through the second input terminal 82*a*.

The switch 65 includes a source connected to the electromagnetic brake 30. More specifically, the source of the switch 65 is connected to a first end of the electromagnetic coil 31*a*. The electromagnetic coil 31*a* includes a second end connected to the ground line 45. The second controller 60 further includes a diode D10. The diode D10 includes an anode connected to the ground line 45. The diode D10 includes a cathode connected to the source of the switch 65.

When the switch 65 is ON, the electric power of the first battery 41*a* or the electric power of the second battery 42*a* is delivered to the electromagnetic brake 30 via the switch 65. This turns OFF the electromagnetic brake 30, resulting in deactivation of the braking of the motor 25 by the electromagnetic brake 30. When the switch 65 is OFF, neither the electric power of the first battery 41*a* nor the electric power of the second battery 42*a* is delivered to the electromagnetic brake 30. In this case, the electromagnetic brake 30 is turned ON, to thereby brake the motor 25.

The selector circuit 85 selectively outputs the first or second battery voltage Vb1, Vb2 to the drive circuit 61. For example, when the first battery voltage Vb1 is higher than the second battery voltage Vb2, the first battery voltage Vb1 is input to the drive circuit 61 via the first rectifier circuit 81. In this case, upon the switch 65 being turned ON, the electric power of the first battery 41*a* is delivered to the electromagnetic coil 31*a*. That is, the electromagnetic coil 31*a* receives the excitation current from the first battery 41*a*.

On the other hand, when the second battery voltage Vb2 is higher than the first battery voltage Vb1, the second battery voltage Vb2 is input to the drive circuit 61 via the second rectifier circuit 82. In this case, upon the switch 65 being turned ON, the electric power of the second battery 42*a* is delivered to the electromagnetic coil 31*a*. That is, the electromagnetic coil 31*a* receives the excitation current from the second battery 42*a*. Hereinafter, the first or second battery voltage Vb1, Vb2 to be output to the drive circuit 61 is referred to as "brake voltage".

The second controller 60 includes a second regulator 64. The second regulator 64 receives the brake voltage. The second regulator 64 generates a second control voltage Vc2 based on the brake voltage. The second control voltage Vc2 is delivered to the drive circuit 61, a signal-processing circuit 62, and a voltage adjustment circuit (or a voltage control circuit) 63.

The second controller 60 includes the signal-processing circuit 62. The signal-processing circuit 62 receives the first and second control signals Sa, Sb from the control circuit 51. More specifically, the control circuit 51 in the present embodiment outputs the first and second control signals Sa, Sb in response to the deactivating requirement being satisfied or having been satisfied. The control circuit 51 outputs the first and second control signals Sa, Sb, to thereby deactivate the electromagnetic brake 30. Upon the braking requirement being satisfied while the electromagnetic brake 30 is deactivated, the control circuit 51 stops the first and second control signals Sa, Sb.

The first control signal Sa has a direct-current (DC) voltage. The DC voltage has a voltage value that is fixed. The voltage value of the DC voltage is equal to or greater than a first specific voltage value. That is, the DC voltage in the present embodiment is a fixed voltage. The first control signal Sa functions as a power source for a first buffer 71, which will be described later. When the first control signal Sa is properly output, the first buffer 71 properly operates. When the first control signal Sa is not output or not properly output, the first buffer 71 does not operate or does not properly operate. In this case, the switch 65 is turned OFF, resulting in the electromagnetic coil 31*a* being not energized. That is, the motor 25 is braked by the electromagnetic brake 30. The first control signal Sa being not properly output may mean that the voltage value of the first control signal Sa is equal to or less than a specific minimum value. The specific minimum value may be lower than the first specific voltage value.

The second control signal Sb has two or more pulse voltages (for example, two or more square-wave voltages). The two or more pulse voltages may be generated periodically or non-periodically. The second control signal Sb in the present embodiment has two or more pulse voltages that are periodically generated at a fixed cycle.

When receiving both the first and second control signals Sa, Sb, the signal-processing circuit 62 outputs a deactivating signal. In a precise sense, the first and second control signals Sa, Sb are those that are proper (i.e., the proper first and second control signals Sa, Sb). The proper first control signal Sa has the DC voltage described above, and the proper second control signal Sb has the two or more pulse voltages described above. Hereinafter, "the first control signal Sa" means the proper first control signal Sa unless otherwise specified. The same applies to the second control signal Sb.

The signal-processing circuit 62 is connected to the second gate circuit 66 via a resistor R1. The deactivating signal is input from the signal-processing circuit 62 to the drive circuit 61 via the resistor R1. In response to receiving the deactivating signal, the drive circuit 61 delivers the excitation current to the electromagnetic coil 31*a*. As a result, the electromagnetic brake 30 is turned OFF (that is, the braking is deactivated).

The signal-processing circuit 62 does not output the deactivating signal when not receiving the first control signal Sa and/or the second control signal Sb. When not receiving the deactivating signal, the drive circuit 61 interrupts a path of the excitation current to the electromagnetic coil 31*a*, to thereby turn ON the electromagnetic brake 30. In other words, in the present embodiment, the electromagnetic brake 30 is turned OFF when the signal-processing circuit 62 receives both the first and second control signals Sa, Sb. The electromagnetic brake 30 is turned ON when the signal-processing circuit 62 does not receive the first control signal Sa and/or the second control signal Sb.

Figure 5:
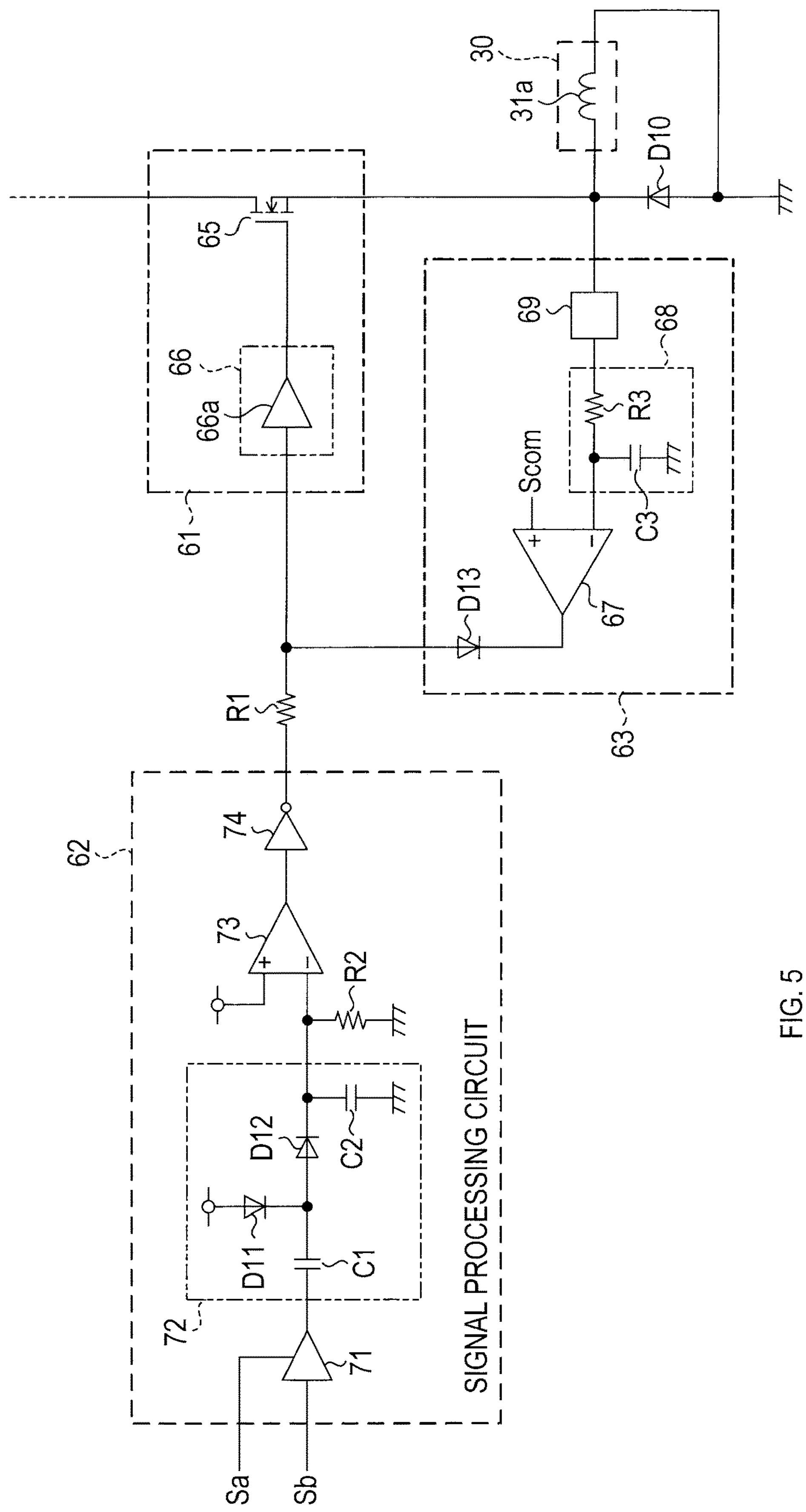
FIG. 5 is an electric circuit diagram showing a detailed configuration of a signal-processing circuit and a drive circuit.

The deactivating signal has, for example, a second specific voltage value. Specifically, the deactivating signal is also referred to as a High-level signal. The deactivating signal is input to the second gate circuit 66. As shown in FIG. 5, the second gate circuit 66 includes a second buffer 66*a*. The second gate circuit 66 turns OFF the switch 65 during the second gate circuit 66 not receiving the deactivating signal. Consequently, the excitation current is not delivered to the electromagnetic coil 31*a* during the second gate circuit 66 not receiving the deactivating signal. In response to receiving the deactivating signal, the second gate circuit 66 turns ON the switch 65. Consequently, the excitation current is delivered to the electromagnetic coil 31*a* during the second gate circuit 66 receiving the deactivating signal.

When receiving the deactivating signal, the second gate circuit 66 applies a gate drive voltage to a gate of the switch 65, to thereby turn ON the switch 65. A value of the gate drive voltage is, for example, a value of a specific minimum ON-voltage or greater. The value of the minimum ON-voltage corresponds to, for example, a voltage value obtained by adding a ON-state maintaining voltage to a voltage to be applied to the source of the switch 65 that has been turned ON. The ON-state maintaining voltage corresponds to a gate-source voltage required to keep the switch 65 ON. When the switch 65 is ON, a source of the switch 65 is applied with a voltage close to or approximately equal to the brake voltage. The second gate circuit 66 may include any configuration that can generate the gate drive voltage. The second gate circuit 66 may include, for example, a not-shown booster circuit (for example, a charge pump circuit) to boost (or raise) an output voltage of the second buffer 66*a*. In this case, the gate drive voltage may include an output voltage from the booster circuit. That is, the output voltage from the booster circuit may be applied to the gate of the switch 65. Furthermore, for example, the second buffer 66*a* may be configured to generate the gate drive voltage. Still further, for example, the deactivating signal from the signal-processing circuit 62 may have a voltage value equal to or approximately equal to the value of the gate drive voltage.

With reference to FIG. 5, a description is given to a specific configuration of the signal-processing circuit 62. The signal-processing circuit 62 includes the first buffer 71 described above, a charge pump circuit 72, a resistor R2, a first comparator 73, and an inverter circuit 74.

The first control signal Sa is input to a power-supply input terminal of the first buffer 71. The first control signal Sa functions as a power source for the first buffer 71. That is, the first buffer 71 operates with the first control signal Sa. The second control signal Sb is input to a signal input terminal of the first buffer 71. Upon receiving the second control signal Sb, the first buffer 71 outputs an output signal corresponding to the second control signal Sb. In other words, the first buffer 71 enables the second control signal Sb to output the same. For example, when the second control signal Sb is a High-level signal, the first buffer 71 outputs an output signal of a High level. When the second control signal Sb is a Low-level signal, the first buffer 71 outputs an output signal of a Low level. As discussed above, the second control signal Sb in the present embodiment has the two or more pulse voltages. Accordingly, the first buffer 71, which has received the second control signal Sb, outputs a pulse voltage (hereinafter, referred to as "charging pulse") corresponding to the second control signal Sb. The charging pulse from the first buffer 71 is input to the charge pump circuit 72.

The charge pump circuit 72 includes a first capacitor C1, a second capacitor C2, a first diode D11, and a second diode D12. The first capacitor C1 includes a first end connected to an output terminal of the first buffer 71. In other words, the charging pulse is input to the first end of the first capacitor C1. The first capacitor C1 includes a second end connected to a cathode of the first diode D11 and an anode of the second diode D12.

The anode of the first diode D11 receives the second control voltage Vc2. The cathode of the second diode D12 is connected to a first end of the second capacitor C2. A second end of the capacitor C2 is connected to the ground line 45. A voltage at the first end of the second capacitor C2 corresponds to an output voltage of the charge pump circuit 72 (hereinafter, referred to as "charging voltage"). The charging voltage is input to an inverting input terminal of the first comparator 73. That is, the first end of the second capacitor C2 is connected to the inverting input terminal of the first comparator 73. The first end of the second capacitor C2 is connected to the ground line 45 via the resistor R2.

The charge pump circuit 72 outputs the charging voltage by receiving the charging pulse. A value of the charging voltage is higher than a value of a voltage (that is, the second control voltage Vc2) input to the first diode D11. The value of the charging voltage may be, for example, twice, or approximately twice as much as the second control voltage Vc2. In this case, a magnitude (or an amplitude) of the charging pulse may be, for example, equal to or approximately equal to a magnitude (or an amplitude) of the second control voltage Vc2. As the operation principle of the charge pump circuit 72 has been well known, a detailed description thereof will be omitted here.

When not properly receiving the charging pulse, the charge pump circuit 72 does not output the charging voltage. For example, when receiving, from the first buffer 71, a voltage distinctive from the pulse voltage, the charge pump circuit 72 does not output a proper charging voltage. Thus, it can be said that the charge pump circuit 72 has a function to detect that the charging pulse is properly output from the first buffer 71, in other words, a function to detect that the second control signal Sb is enabled by the first buffer 71. That is, a state where the charging voltage is being output from the charge pump circuit 72 means that (i) the second control signal Sb has been enabled by the first buffer 71 and (ii) the second control signal Sb enabled has been detected by the charge pump circuit 72.

The first comparator 73 includes a non-inverting input terminal to receive the second control voltage Vc2. The first comparator 73 includes an output terminal connected to the inverter circuit 74. The inverter circuit 74 receives an output signal of the first comparator 73. The inverter circuit 74 inverts logic levels of the signal input from the first comparator 73 (input signal) and then outputs the signal input (also referred to as "output signal"). The output signal of the inverter circuit 74 corresponds to an output signal (that is, the deactivating signal) of the signal-processing circuit 62. That is, the output signal of the inverter circuit 74 is input to the drive circuit 61 as the deactivating signal via the resistor R1.

When the first control signal Sa and/or the second control signal Sb are/is not input to the first buffer 71, the first buffer 71 does not output the charging pulse. In this case, the charge pump circuit 72 does not generate the charging voltage. Consequently, the first comparator 73 outputs a High-level signal. When the High-level signal is output from the first comparator 73, the inverter circuit 74 outputs a Low-level signal, in other words, the signal-processing circuit 62 does not output the deactivating signal. Accordingly, the switch 65 is turned OFF and thus, the electromagnetic brake 30 is not deactivated.

When the first and second control signals Sa, Sb are input to the first buffer 71, the first buffer 71 outputs the charging pulse. In this case, the charge pump circuit 72 generates the charging voltage. Consequently, the first comparator 73 outputs a Low-level signal. When the Low-level signal is output from the first comparator 73, the inverter circuit 74 outputs the High-level signal. In other words, the signal-processing circuit 62 outputs the deactivating signal. Accordingly, the switch 65 is turned ON and thus, the electromagnetic brake 30 is deactivated.

For example, assume that the first or second control signal Sa, Sb is output despite a failure occurring in the first controller 50 discourages fulfillment of the deactivating requirement. In this case, the electromagnetic brake 30 is not deactivated.

More specifically, assume that, for example, where the first control signal Sa is not output, but the second control signal Sb is output. In this case, the first buffer 71 does not operate. That is, the first buffer 71 does not output the charging pulse despite receipt of the second control signal Sb. Thus, the switch 65 remains OFF, and thereby the braking by the electromagnetic brake 30 is maintained.

Furthermore, assume that, for example, where the second control signal Sb is not output, but the first control signal Sa is output. In this case, the second control signal Sb is not input to the first buffer 71 despite the first buffer 71 operating. That is, the first buffer 71 does not output the charging pulse. Accordingly, the switch 65 remains OFF, and thereby the braking by the electromagnetic brake 30 is also maintained in this case.

Next, a description will be given to a voltage adjustment circuit 63. The voltage adjustment circuit 63 receives the command signal Scom from the control circuit 51. The voltage adjustment circuit 63 adjusts (or controls) a magnitude of a voltage to be applied to the electromagnetic coil 31*a* in accordance with the command signal Scorn. More specifically, the voltage adjustment circuit 63 in the present embodiment adjusts a mean value of the voltage to be applied to the electromagnetic coil 31*a* (in other words, a mean value of the excitation current or the electric power to be delivered to the electromagnetic coil 31*a*). Hereinafter, the mean value of the voltage to be applied to the electromagnetic coil 31*a* is referred to as "mean applied voltage".

As shown in FIGS. 4 and 5, the voltage adjustment circuit 63 includes a second comparator 67, a filter circuit 68, an attenuator 69, and a diode D13. The attenuator 69 is connected to the first end of the electromagnetic coil 31*a*. The attenuator 69 receives an actual voltage of the electromagnetic coil 31*a* at the first end (hereinafter, referred to as "actual coil voltage"). The attenuator 69 outputs the actual coil voltage (output voltage) by attenuating the same at a specific attenuation rate. The output voltage of the attenuator 69 is input to the filter circuit 68.

The filter circuit 68 includes a resistor R3 and a capacitor C3. The resistor R3 includes a first end to receive the output voltage from the attenuator 69. The resistor R3 includes a second end connected to a first end of the capacitor C3 and an inverting input terminal of the second comparator 67. The second end of the capacitor C3 is connected to the ground line 45. The filter circuit 68 smooths (that is, averages) the output voltage from the attenuator 69, and outputs a voltage smoothed (hereinafter, referred to as "smoothed voltage") to the second comparator 67. The smoothed voltage corresponds to one example of the actual voltage signal in the present disclosure.

In the voltage adjustment circuit 63, the command signal Scom is input to a non-inverting input terminal of the second comparator 67. The command signal Scorn indicates a desired value of an average applied voltage. In the present embodiment, the desired value of the average applied voltage can be set to a first value or a second value.

The first value is lower than the first rated value of the first battery 41*a* (or the second rated value of the second battery 42*a*). The first value is equal to or greater than a first minimum excitation voltage value. The first minimum excitation voltage value corresponds to a minimum value of the average applied voltage necessary to energize the electromagnetic coil 31*a* (that is, deactivate the electromagnetic brake 30). The first value may be, for example, a rated voltage of the electromagnetic coil 31*a*. The first value may be, for example, two thirds of the first rated value of the first battery 41*a*. The rated voltage value of the electromagnetic coil 31*a* in the present embodiment is, for example, 24V.

The second value is smaller than the first value. The second value is equal to or greater than a second minimum excitation voltage value. The second minimum excitation voltage value corresponds to a minimum value of the average applied voltage necessary to maintain an energized state of the electromagnetic coil 31*a* (that is, maintain a deactivated state of the electromagnetic brake 30). The second value may be, for example, one thirds of the first rated value of the first battery 41*a* (or the second rated value of the second battery 42*a*). The second value may be, for example, one half of the first value. In the present embodiment, the second value is, for example, 12V.

When the deactivating requirement is satisfied, the control circuit 51 sets, during a specific initial deactivation time period, the desired value of the average applied voltage to the first value. In other words, the control circuit 51 outputs the command signal Scom indicating the first value. The initial deactivation time period is a time period to enable energization of the electromagnetic coil 31*a* with the average applied voltage having the first value. In other words, the initial deactivation time period is a time period to enable deactivation of the electromagnetic brake 30 with the average applied voltage having the first value. The initial deactivation time period may be, for example, one second.

The second comparator 67 outputs the High-level or the Low-level signal based on a voltage value of the command signal Scorn and a value of the smoothed voltage from the filter circuit 68. The second comparator 67 outputs the High-level signal when the value of the smoothed voltage is less than (or equal to or less than) the voltage value of the command signal Scorn, in other words, when the value of the average applied voltage is less than (or equal to or less than) the desired value.

The second comparator 67 outputs the Low-level signal when the value of the smoothed voltage is greater than (or equal to or greater than) the voltage value of the command signal Scorn, in other words, when the value of the average applied voltage is greater than (or equal to or greater than) the desired value. The second comparator 67 includes an output terminal connected to a cathode of the diode D13. The diode D13 includes an anode connected to an output terminal of the signal-processing circuit 62 via the resistor R1. In other words, the deactivating signal from the signal-processing circuit 62 is also input to the diode D13 as well as to the drive circuit 61.

When the High-level signal is output from the second comparator 67, the deactivating signal is enabled. That is, the deactivating signal is input to the drive circuit 61. Consequently, the switch 65 is turned ON, resulting in the electromagnetic brake 30 being deactivated. On the other hand, when the Low-level signal is output from the second comparator 67, the output terminal of the signal-processing circuit 62 is connected to the ground line 45 via the diode D13 and the output terminal of the second comparator 67. In this case, the deactivating signal is disabled, resulting in the deactivating signal not being input to the drive circuit 61. Thus, the switch 65 is turned OFF, and thereby the electromagnetic brake 30 is resultantly activated.

During receipt of the command signal Scom corresponding to (or related to) the first value (hereinafter, referred to as "first command signal"), the voltage adjustment circuit 63 adjusts the value of the average applied voltage to the first value. Specifically, when the value of the average applied voltage exceeds (or is equal to or greater than) the first value, the switch 65 is turned OFF. When the switch 65 is turned OFF, the value of the average applied voltage is equal to or less than (or less than) the first value. When the value of the average applied voltage is equal to or less than (or less than) the first value, the switch 65 is turned ON. That is, the switch 65 is turned ON or OFF in accordance with a difference between the value of the average applied voltage and the first value. Accordingly, the value of the average applied voltage is adjusted to the first value.

In response to elapse of the initial deactivation time period since the desired value of the average applied voltage has been set to the first value, the control circuit 51 sets the desired value of the average applied voltage to the second value. In other words, after energizing the electromagnetic coil 31*a* with the average applied voltage having the first value, the control circuit 51 decreases the value of the average applied voltage. Accordingly, the control circuit 51 can maintain the energized state of the electromagnetic coil 31*a* while reducing a power consumption to energize the electromagnetic coil 31*a*.

(3) Operation Example of Electromagnetic Brake

Figure 6:
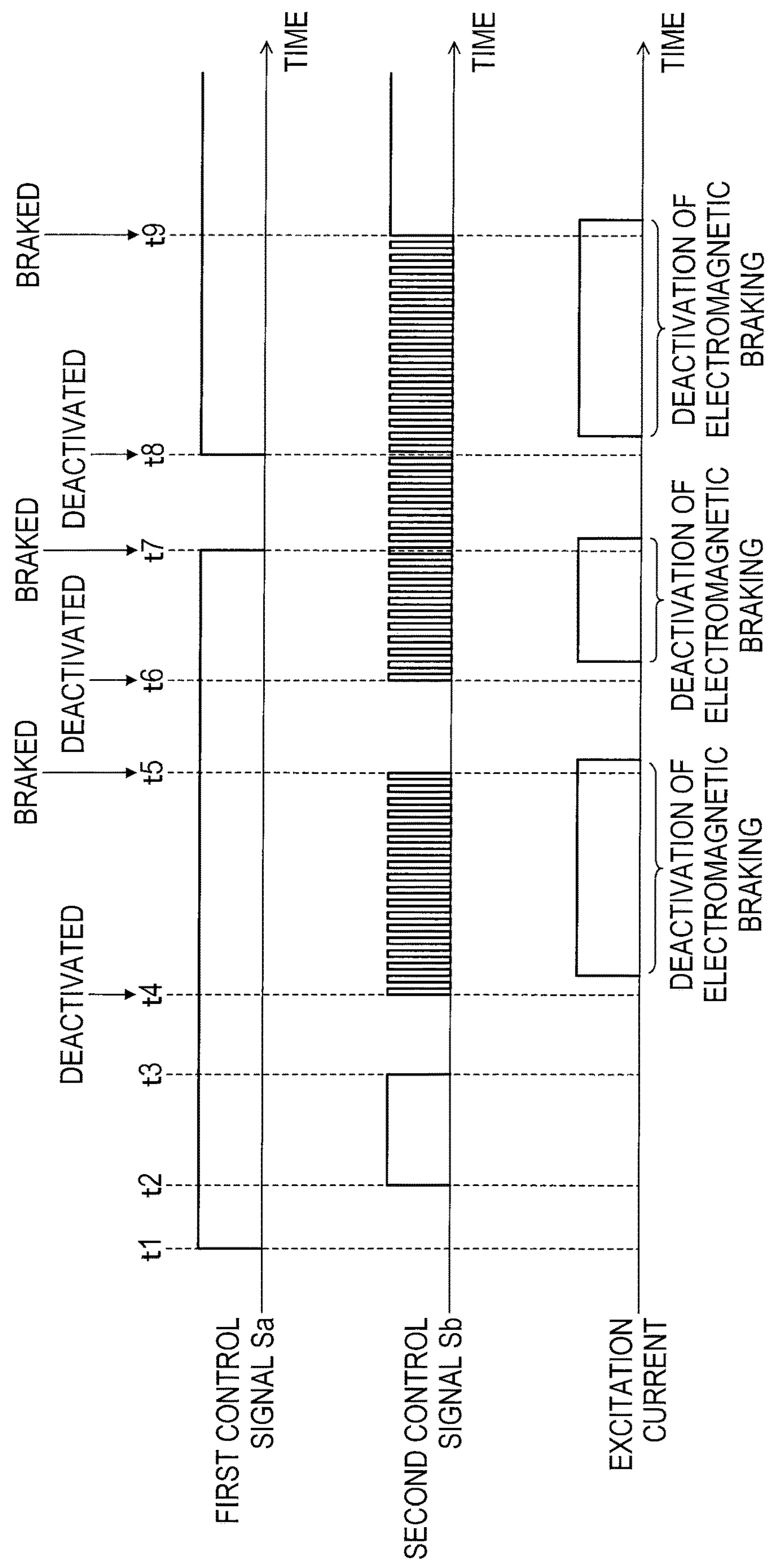
FIG. 6 is a time chart showing an operation example of an electromagnetic brake.

With reference to FIG. 6, a description is given to an operation example of the electromagnetic brake 30 in the present embodiment. In FIG. 6, the term "DEACTIVATED" at times t4, t6, t8 indicates that the deactivating requirement has been satisfied. Furthermore, the term "BRAKED" at times t5, t7, t9 indicates that the braking requirement has been satisfied. Still further, a period from the time t1 through the time t4, a period between the times t5 and t6, and a period after the time t9 illustrate that, due to some malfunction (that is, the first control signal Sa is not properly output), the first control signal Sa is output despite the deactivating requirement not being satisfied. The first control signal Sa is properly output during periods from the time t4 through the time t5, from the time t6 through the time t7, and from the time t8 through the time t9.

Furthermore, FIG. 6 illustrates that, during a period from the time t2 through the times t3 and a period after the time t9, an abnormal second control signal Sb is output due to some malfunction. The abnormal second control signal Sb is distinctive from a proper pulse voltage. Still further, a period from the time t7 through the time t8 illustrates that, due to some malfunction (that is, the second control signal Sb is not properly output), the second control signal Sb is output despite the deactivating requirement not being satisfied. The second control signal Sb is properly output during periods from the time t4 through the time t5, from the time t6 through the time t7, and from the time t8 through the time t9.

In the above example in FIG. 6, despite the deactivating requirement not being satisfied, the first control signal Sa is improperly (that is, unintentionally) output during the periods from the time t1 through the time t4, from the time t5 through the time t6, and after the time t9. However, the second control signal Sb is not output in any of these periods (that is, the second control signal Sb is properly controlled). Thus, the excitation current is not delivered to the electromagnetic brake 30. Accordingly, the braking by the electromagnetic brake 30 is maintained. Furthermore, during the period from the time t7 through the time t8, the second control signal Sb is improperly (that is, unintentionally) output despite the deactivating requirement not being satisfied. However, as the first control signal Sa is not output during this period (that is, the first control signal Sa is properly controlled), the excitation current is not supplied to the electromagnetic brake 30. Accordingly, the braking by the electromagnetic brake 30 is maintained. Due to the deactivating requirement being satisfied during the periods from the time t4 through the time t5, from the time t6 through the time t7, and from the time t8 through the time t9, both the first and second control signals Sa, Sb are properly output. Thus, the excitation current is delivered to the electromagnetic brake 30, resulting in deactivation of the electromagnetic brake 30.

(4) Electromagnetic Braking Process

Figure 7:
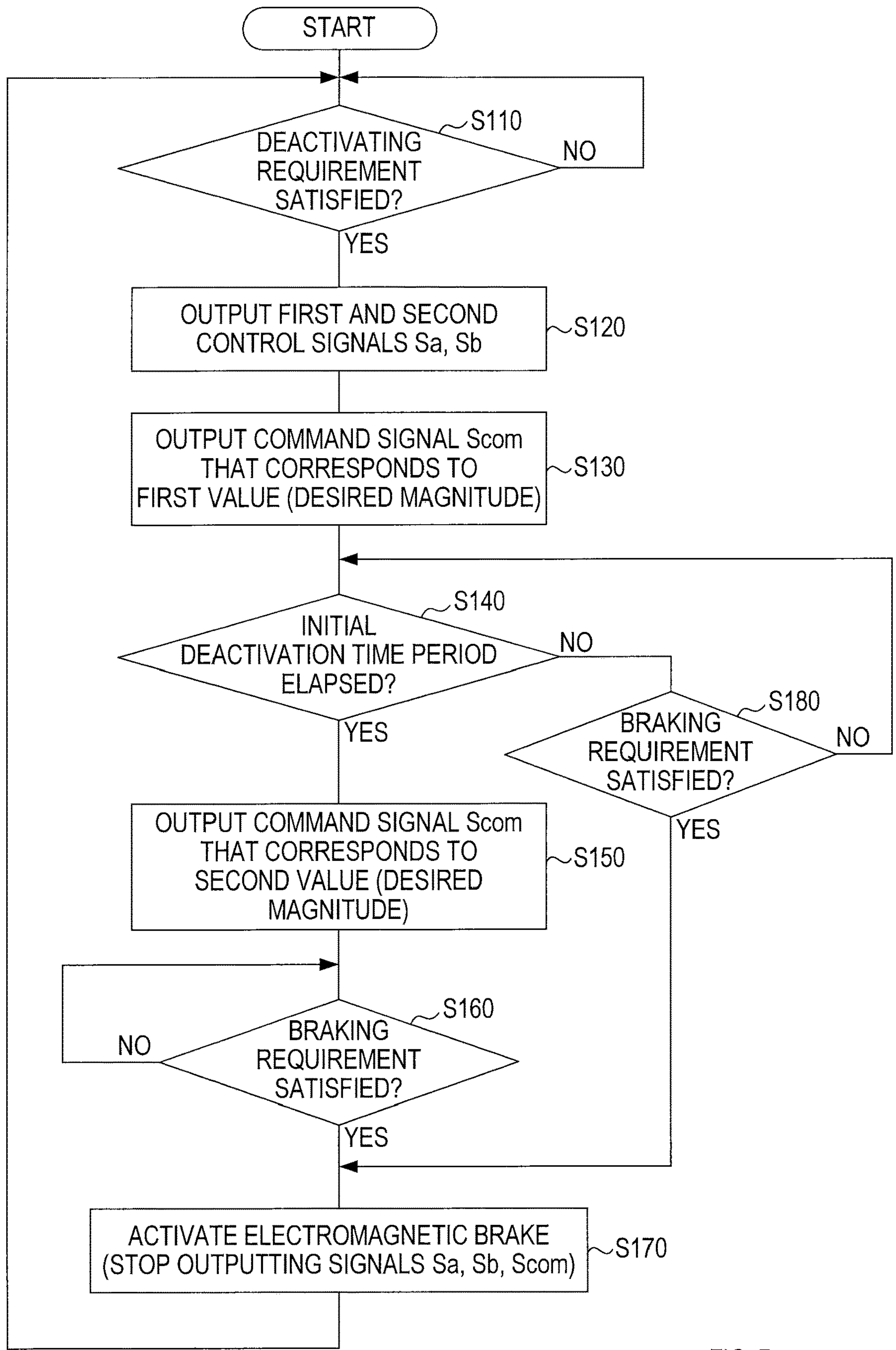
FIG. 7 is a flow chart of an electromagnetic braking process.

The above-described operation of the electromagnetic brake 30 is achieved by the control circuit 51 (specifically, a CPU 51*a*) executing the electromagnetic braking process shown in FIG. 7. Upon being activated, the CPU 51*a* executes the electromagnetic braking process (hereinafter, referred to as "present process").

Upon starting the electromagnetic braking process, the CPU 51*a* determines whether the braking requirement is satisfied in S110. If the braking requirement is not satisfied, then the CPU 51*a* repeats a process of S110. If the braking requirement is satisfied, then the present process proceeds to S120.

In S120, the CPU 51*a* outputs the first and second control signals Sa, Sb. In S130, the CPU 51*a* sets the desired value of the average applied voltage to the first value. Specifically, the CPU 51*a* outputs the command signal Scom corresponding to the first value. This applies a voltage having the first value on average to the electromagnetic coil 31*a*, which is thereby energized. Upon the electromagnetic coil 31*a* being energized, the electromagnetic brake 30 is deactivated.

In S140, the CPU 51*a* determines whether the initial deactivation time period has elapsed since the output of the command signal Scom in S130. If the initial deactivation time period has not elapsed, then the present process proceeds to S180. In S180, the CPU 51*a* determines whether the braking requirement has been satisfied. If the braking requirement has not been satisfied, then the present process proceeds to S140. If the braking requirement has been satisfied, then the present process proceeds to S170.

If the initial deactivation time period has elapsed in S140, then the present process proceeds to S150. In S150, the CPU 51*a* sets the desired value of the average applied voltage to the second value. Specifically, the CPU 51*a* outputs the command signal Scorn corresponding to (or related to) the second value. This applies a voltage having the second value on average to the electromagnetic coil 31*a*, which thereby remains energized. That is, the braking by the electromagnetic brake 30 is maintained.

In S160, the CPU 51*a* determines whether the braking requirement has been satisfied. If the braking requirement has not been satisfied, then the CPU 51*a* repeats a process of S160. If the braking requirement has been satisfied, then the present process proceeds to S170.

In S170, the CPU 51*a* activates the electromagnetic brake 30. Specifically, the CPU 51*a* stops outputting the first and second control signals Sa, Sb and the command signal Scorn. This stops power delivery to the electromagnetic coil 31*a*. As a result, the electromagnetic coil 31*a* is de-energized, and thereby the electromagnetic brake 30 is activated. That is, the drive wheels are braked by the electromagnetic brake 30.

(5) Correspondence between Terms

In the present embodiment, the first buffer 71 corresponds to one example of the first circuit in the overview. The charge pump circuit 72 corresponds to one example of the second circuit in the overview. The first comparator 73 and the inverter circuit 74 correspond to one example of the third circuit in the overview. The first rectifier circuit 81 and the second rectifier circuit 82 correspond to one example of the selector circuit in the overview. The command signal Scorn corresponds to one example of the voltage command signal in the overview. The filter circuit 68 corresponds to one example of the voltage detection circuit in the overview.

3. Other Embodiments

Although one embodiment to implement the overview has been described above, the overview is not limited to the above-described embodiment, but may be implemented in various forms.

(3-1) Each of the first and second control signals Sa, Sb may be any signal. The signal-processing circuit 62 may include any configuration to enable proper output of the deactivating signal based on the first and second control signals Sa, Sb.

(3-2) The second control signal Sb may be in the form of a signal distinctive from the pulse voltage. In this case, the signal-processing circuit 62 may be configured to enable output of a proper deactivating signal based on the second control signal Sb.

The second control signal Sb in the form of the pulse voltage exhibits an effect to be described as follows. When a malfunction occurs in the control circuit 51 (specifically, the microcomputer), there is a possibility that a faulty signal is output from an output port of the second control signal Sb in the control circuit 51. The faulty signal is a signal different from the proper second control signal Sb. The faulty signal may be, for example, a signal maintained at a High or Low level. Alternatively, when the malfunction occurs in the control circuit 51, there is a possibility that the output port is opened. Assume that the proper second control signal Sb is the signal maintained at the High level. In this case, the malfunction described above may cause output of such a High-level signal from the output port despite a failure to satisfy the deactivating requirement. That is, when the High-level signal is erroneously output despite the failure to satisfy the deactivating requirement, the electromagnetic brake 30 may be deactivated. On the other hand, the malfunction in the control circuit 51 does not cause or is not likely to cause output of the pulse voltage from the output port. For this reason, it is possible to improve reliability of the electromagnetic brake 30 by utilizing a signal having the pulse voltage as the second control signal Sb in the above-described embodiment.

(3-3) The signal-processing circuit 62 may include a microcomputer to detect the second control signal Sb in place of the charge pump circuit 72, the first comparator 73, and the inverter circuit 74. This microcomputer may output the High-level signal to the first buffer 71 in response to detection of the second control signal Sb. Furthermore, the output signal of the first buffer 71 may be output as the deactivating signal from the signal-processing circuit 62.

(3-4) The voltage adjustment circuit 63 may be configured in any manner that can adjust the desired value of the average applied voltage. For example, the attenuator 69 may be omitted (or eliminated), such that the second comparator 67 receives the command signal Scorn having the same voltage value as the desired value. In this case, for example, the command signal Scorn output from the control circuit 51 may have the same voltage value as the desired value. Furthermore, there may be provided, for example, an amplifier circuit to amplify the command signal Scom output from the control circuit 51, and thereby the command signal Scorn amplified by the amplifier circuit may be input to the second comparator 67.

(3-5) The electromagnetic coil 31*a* may be disposed in the upstream of the switch 65.

(3-6) The electromagnetic brake 30 may be disposed at any position that enables braking of the electric-powered wheelbarrow 1. The electromagnetic brake 30 may be provided to, for example, a transmission path for the rotational force of the motor 25. The transmission path starts from the motor 25 to the drive wheels through the transmission mechanism 21. In other words, the electromagnetic brake 30 may directly or indirectly apply the braking force to the drive wheels to brake the same. In the above-described embodiment, the electromagnetic brake 30 directly applies the braking force to the motor 25, to thereby indirectly apply the same to the drive wheels. However, the electromagnetic brake 30 may directly apply the braking force to the drive wheels. More specifically, the electromagnetic brake 30 may be disposed, for example, inside or in the vicinity of the transmission mechanism 21. Furthermore, the electromagnetic brake 30 may be provided to, for example, the transmission path between the motor 25 and the transmission mechanism 21. Still further, there may be the electromagnetic brake 30, for example, between the transmission mechanism 21 and each of the front wheels 8, 9. Still further, the electromagnetic brake 30 may brake any wheel(s) of the electric-powered wheelbarrow 1. The electromagnetic brake 30 may apply the braking force to, for example, the driven wheels. The electromagnetic brake 30 may apply the braking force to any number of wheels.

(3-7) The electric-powered wheelbarrow 1 may be embodied distinctively from the four-wheeled vehicle. For example, the electric-powered wheelbarrow 1 may include two wheels or less, or five wheels or more. Furthermore, any wheel can be a drive wheel.

(3-8) The first battery 41*a* and/or the second battery 42*a* may be built into the electric-powered wheelbarrow 1. The electric-powered wheelbarrow 1 may include only one battery (for example, the first battery 41*a*) detachably mounted therewith or built therein.

(3-9) Two or more functions performed by a single element in the above-described embodiments may be achieved by two or more elements, or a function performed by a single element may be achieved by two or more elements. Furthermore, two or more functions performed by two or more elements may be achieved by a single element, and a function performed by two or more elements may be achieved by a single element. Furthermore, a part of a configuration in the above-described embodiments may be omitted. Still further, at least a part of a configuration in the above-described embodiments may be added to, or may replace, another configuration in the above-described embodiments.

What is claimed is:

1. An electric-powered wheelbarrow comprising:

a motor;

a motor driver configured to deliver an electric power to the motor to thereby rotate the motor;

a wheel configured to be driven by the motor;

an electromagnetic brake including an electromagnetic coil, the electromagnetic coil being configured to receive an excitation current to thereby be energized, the electromagnetic brake being configured (i) to be activated to apply a braking force to the wheel in response to the electromagnetic coil being de-energized and (ii) to be deactivated to release the braking force from the wheel in response to the electromagnetic coil being energized;

a control circuit configured to output a first control signal and a second control signal;

a signal-processing circuit configured (i) to receive the first control signal and the second control signal and (ii) to thereby output a deactivating signal; and a drive circuit configured to receive the deactivating signal to thereby deliver the excitation current to the electromagnetic coil.

2. The electric-powered wheelbarrow according to claim 1, wherein the control circuit is configured to output the first control signal and the second control signal in response to a deactivating requirement being satisfied or having been satisfied, the deactivating requirement being required to deactivate the electromagnetic brake.

3. The electric-powered wheelbarrow according to claim 1, wherein the first control signal has a fixed voltage greater than zero, and wherein the second control signal has two or more pulse voltages.

4. The electric-powered wheelbarrow according to claim 3, wherein the signal-processing circuit is configured to output the deactivating signal in response to (i) the first control signal received being in a first proper state and (ii) the second control signal received being in a second proper state, the first control signal in the first proper state having the fixed voltage, and the second control signal in the second proper state having the two or more pulse voltages.

5. The electric-powered wheelbarrow according to claim 4, wherein the signal-processing circuit includes:

a first circuit configured to enable the second control signal in response to the first control signal received being in the first proper state;

a second circuit configured to detect the second control signal enabled; and a third circuit configured to output the deactivating signal during the second circuit detecting the second control signal enabled.

6. The electric-powered wheelbarrow according to claim 5, wherein the second circuit is configured to detect the second control signal (i) having been enabled and (ii) being in the second proper state.

7. The electric-powered wheelbarrow according to claim 1, wherein the motor driver is configured to receive, from a first battery or a second battery, the electric power to be delivered to the motor.

8. The electric-powered wheelbarrow according to claim 1, wherein the drive circuit is configured to receive, from a first battery or a second battery, the excitation current to be delivered to the electromagnetic coil.

9. The electric-powered wheelbarrow according to claim 8, wherein the first battery includes a first positive electrode;

wherein the second battery includes a second positive electrode;

wherein the electric-powered wheelbarrow further includes a selector circuit connected to the first positive electrode and the second positive electrode, the selector circuit being configured to (i) receive a first current from the first battery and a second current from the second battery and (ii) output the excitation current including the first current or the second current, and wherein the drive circuit is configured to receive the excitation current from the selector circuit and deliver, to the electromagnetic coil, the excitation current received.

10. The electric-powered wheelbarrow according to claim 9, wherein the selector circuit includes:

a first rectifier circuit including (i) a first input terminal configured to receive the first current from the first battery and (ii) a first output terminal configured to output the first current received from the first input terminal, the first rectifier circuit being configured to inhibit the second current from flowing from the first output terminal to the first input terminal; and a second rectifier circuit including (i) a second input terminal configured to receive the second current from the second battery and (ii) a second output terminal connected to the first output terminal, the second output terminal being configured to output the second current received from the second input terminal, and the second rectifier circuit being configured to inhibit the first current from flowing from the second output terminal to the second input terminal.

11. The electric-powered wheelbarrow according to claim 1, further comprising a voltage adjustment circuit configured to adjust an excitation voltage to be applied to the electromagnetic coil.

12. The electric-powered wheelbarrow according to claim 11, wherein the control circuit is further configured to output a voltage command signal to the voltage adjustment circuit, the voltage command signal designating a desired magnitude of the excitation voltage, and wherein the voltage adjustment circuit is configured to (i) receive the voltage command signal and (ii) adjust the excitation voltage so as to maintain an actual magnitude of the excitation voltage at the desired magnitude designated by the voltage command signal received.

13. The electric-powered wheelbarrow according to claim 12, wherein the control circuit is configured to keep outputting, for a specific length of time, the voltage command signal designating a first value as the desired magnitude in response to a deactivating requirement being satisfied, the deactivating requirement being required to deactivate the electromagnetic brake.

14. The electric-powered wheelbarrow according to claim 13, wherein the control circuit is configured to, in response to having output, for the specific length of time, the voltage command signal to designate the first value, output the voltage command signal designating a second value as the desired magnitude, the second value being smaller than the first value.

15. The electric-powered wheelbarrow according to claim 12, further comprising a voltage detection circuit configured to (i) receive the excitation voltage applied to the electromagnetic coil and (ii) generate an actual voltage signal, the actual voltage signal indicating a mean value of the excitation voltage received, and wherein the voltage adjustment circuit is configured to adjust the excitation voltage so as to maintain the mean value indicated by the actual voltage signal at the desired magnitude.

16. The electric-powered wheelbarrow according to claim 15, wherein the voltage adjustment circuit is configured to, during the drive circuit receiving the deactivating signal, (i) operate the drive circuit so as to deliver the excitation current to the electromagnetic coil in response to the mean value indicated by the actual voltage signal being smaller than the desired magnitude indicated by the voltage command signal and (ii) operate the drive circuit so as to stop the excitation current in response to the mean value indicated by the actual voltage signal being equal to or greater than the desired magnitude indicated by the voltage command signal.

17. A method of controlling an electromagnetic brake of an electric-powered wheelbarrow, the method comprising:

receiving a first control signal and a second control signal, each of the first control signal and the second control signal being required for deactivation of the electromagnetic brake;

in response to simultaneous receipt of both the first control signal and the second control signal, outputting a deactivating signal for deactivating the electromagnetic brake; and in response to receipt of only one of the first and second control signals, not outputting the deactivating signal for deactivating the electromagnetic brake.

18. The method according to claim 17, wherein the second control signal has two or more pulse voltages.

19. The method according to claim 18, wherein the first control signal has a fixed voltage greater than zero.

* * * * *